(No Model.)
J. WATTERS.
VEHICLE CURTAIN FASTENER.
No. 410,304. Patented Sept. 3, 1889.
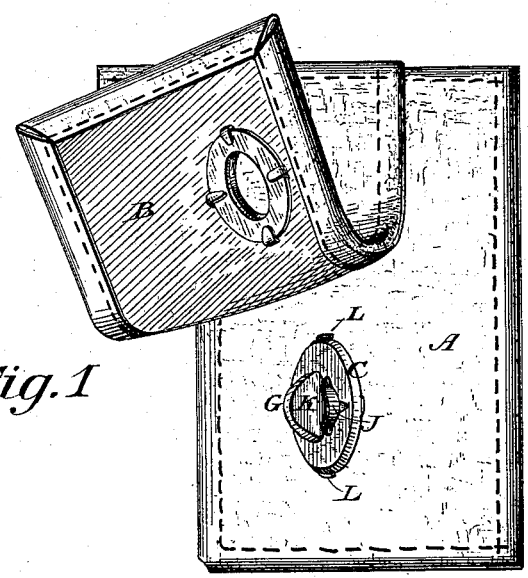
Fig. 1
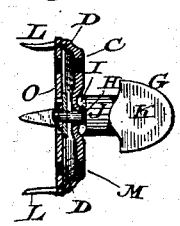
Fig. 2
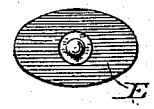
Fig. 10
Fig. 3  Fig. 8  Fig. 4
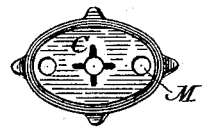  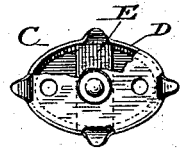
Fig. 7  Fig. 6  Fig. 5
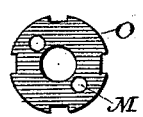  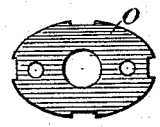
Fig. 9
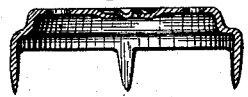
WITNESSES
Wm. H. Rowe.
Warren Hull.
INVENTOR
John Watters
By H. A. Taulmin,
his Attorney.

UNITED STATES PATENT OFFICE.

JOHN WATTERS, OF SPRINGFIELD, OHIO.

VEHICLE-CURTAIN FASTENER.

SPECIFICATION forming part of Letters Patent No. 410,304, dated September 3, 1889.

Application filed August 24, 1888. Serial No. 283,655. (No model.)

*To all whom it may concern:*

Be it known that I, JOHN WATTERS, a citizen of the United States, residing at Springfield, in the county of Clark and State of Ohio, have invented certain new and useful Improvements in Vehicle-Curtain Fasteners, of which the following is a specification, reference being had therein to the accompanying drawings.

This invention relates to certain new and useful improvements in fasteners for vehicle-curtain purposes.

My improvements relate to the manner of connecting the fastener-head with the body of the fastener, whereby all of the parts which constitute the fastener entire are completed and attached together in the shop during the process of manufacture, so that in applying the fastener to the vehicle or vehicle-curtains, seat-rails, or top pillars the several parts are intact, and the labor consists simply in connecting the body of the fastener with the vehicle or said parts thereof, and also relate to the manner of constructing the interior or back of the body of the fastener so as to make provision for the support of an elastic bridge or plate to be placed diametrically within the body as the means of connecting and engaging the head with the body.

In the accompanying drawings, forming a part of this specification, on which like reference-letters indicate corresponding parts, Figure 1 represents a perspective view of my improved fastener and of the parts of a vehicle-curtain fixture with which it may be used; Fig. 2, a sectional view of the fastener detached; Fig. 3, a plan view of the body thereof with the head removed; Fig. 4, an inverted plan view of the body and the spring-plate, showing the interior construction; Fig. 5, a detail view of the back plate; Fig. 6, a plan view of a modified form of contour of the fastener-head; Fig. 7, a detail view of the back plate for a modified form; Fig. 8, a detail perspective view of a modified form of the spring-plate; Fig. 9, a section of the body, and Fig. 10 a view of a modified form of the spring-plate.

The letters A and B designate the parts of the curtain-fixture of the vehicle which it is desired to fasten together. To one of these parts A is attached in Fig. 1 my improved fastener, the body C of which consists of a metallic plate "struck up," spun, or otherwise formed, and preferably of elliptical outline. They may be circular, as suggested in Fig. 5. They may also be of other shapes exteriorly. The body is provided with a central hole $d$ and with a shoulder D, which by preference is annular, being more convenient and more ornamental than if it occupied but a portion of the circumference. The purpose of this shoulder is to afford at the back of and inside of the body C a rest, upon which is placed a bridge-plate E, of spring metal. This plate has an opening $e$ in line with the opening in the body, and through these openings is projected the shank of the fastener-head G, a burr $g$ being placed over the inner end, which is riveted or upset, as seen in Fig. 2. By this means the parts are held together with a constant spring-pressure drawing upon the head, with a tendency to keep the shoulder H thereof in intimate contact with the body. This shoulder is constructed with several small radial ribs I, which register with like indentations $i$ in the body. This construction forms a lock which secures the head H' of the fastener against rotation. The head is further constituted of a neck J and a wing K—the former to occupy the hole in the curtain-plate to be fastened and the latter to form an easy means of manipulating the head. The wing is broad in one direction and narrow in the other, and the curtain to be fastened is easily slipped over the head by turning the wing of the head in a line with the length of the hole in the plate during the act of passing it over the head. This done, the head is turned to present the wing crosswise to the said hole, which prevents its coming off of the head. The body may be fastened to a portion of the curtain-fixture to which the curtain proper is to be secured, or may be fastened to the wooden or other parts of the vehicle, and is constructed with prongs L and holes M, or with either. The prongs are to be inserted through the curtain-fixture and clinched, while the holes are to receive screws or other fastening devices. The shoulder D is cheaply formed in the body, and, as already observed, adds somewhat to the ornamental appearance of it. The spring bridge-plate $e'$, besides being supported by the shoulder, as already described, is otherwise held by the wall on the fastener-body, as seen in Fig. 4.

A back plate O is preferably connected with the body of the fastener, being constructed with notches o, which fit the prongs o', as seen in Figs. 5 and 7. In Fig. 2 the back plate is shown fitted to the body, and in Fig. 4 it is partly broken away. It also has holes p coincident to those in the body of the fastener. In cases where the prongs are not used the fastening devices thus serve to hold the back plate in place. In Fig. 8 I have shown the ends of the spring-plate bent to rest upon the shoulder D. This form may be used, if desired, though I prefer that the blade should be of one flat piece. In Fig. 9 I have illustrated a bridge-plate as occupying the entire shoulder or interior of the body of the fastener. This form will be preferred in instances where unusual strength of the spring-plate is required, so that in referring to the spring-plate it will be understood that the phrase contemplates both this and the other form described, as also similar forms.

I am aware that a carriage-curtain hook has heretofore been patented and put on the market to some extent. In the construction of this device, however, is involved the use of a collar having recesses on the inner face thereof, a spring-seat for a substantially rectangular plate having projections struck up from the body and adapted to fit into the recesses in the collar, and also having projections which extend laterally from the body and enter notches formed in a plate constituting the body of the button. This body of the button has a recess in the under side thereof, in which the collar and spring are placed. The engagement of the struck-up projections of the spring with the recesses in the collar is depended upon to hold the turn button or knob from turning accidentally. This construction involves, as will be seen, numerous parts, and the fact in the trade is, that the spring shortly loses its tension and allows the turn-button to become loose and to turn and let the curtain off. These features of construction differ from my distinct shoulder in the back of the body and the distinct spring-plate resting upon that shoulder. The simplicity of my device and the avoidance of indentations in one piece and projections in another piece, which are designed to match and hold the turn-button, render my device entirely practicable and satisfactory in actual usage.

Having thus fully described my invention, what I claim is new, and desire to secure by Letters Patent, is—

1. In a curtain-fastener, the combination, with the body thereof, an annular shoulder within the back thereof, and a strip of spring metal extending diametrically to the body, resting at its ends upon the said shoulder, and prevented from turning or moving around by contact with the body, of a head fitted upon the outer side of the body and having a shank which extends radially through the body and the spring and is enlarged at its inner end.

2. A curtain-fastener consisting of the following devices: a spun or struck-up metallic body having integral prongs, an annular shoulder, a central hole, and depressions in the outer face of the body near said hole; a strip of spring metal extending diametrically to the body and resting at its ends upon the said shoulder and prevented from turning by contact with the body, and having a central hole; a head wide in one direction and thin in the other at its outer end, and a neck and a shouldered shank rotatably fitted to said hole, and projections on said shoulder of the shank to fit said depressions; the shank being upset at the end, for the purpose described.

In testimony whereof I affix my signature in presence of two witnesses.

JOHN WATTERS.

Witnesses:
L. S. BACON,
N. BARTLETT.